Oct. 8, 1935.  W. L. SCHELLENBACH  2,016,806
CLUTCH
Filed June 20, 1933
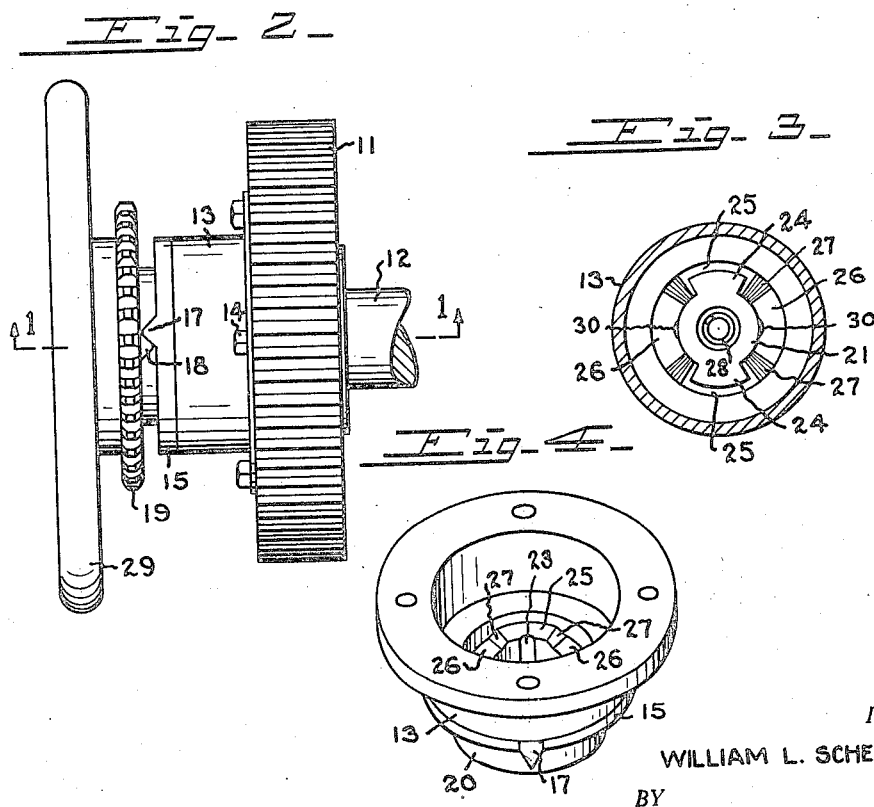
INVENTOR.
WILLIAM L. SCHELLENBACH.
BY
H. C. Karel
ATTORNEY.

Patented Oct. 8, 1935

2,016,806

UNITED STATES PATENT OFFICE 2,016,806

CLUTCH

William L. Schellenbach, Wyoming, Ohio, assignor to The Fay-Egan Manufacturing Company, Cincinnati, Ohio, a corporation of Ohio Application June 20, 1933, Serial No. 676,692

6 Claims. (Cl. 192—67)

My invention relates to a new and improved clutch and more particularly to a clutch used in connection with conveying machinery where it is desired to maintain a definite relation between two moving elements and also to disengage one conveying element from the other and reengage the conveyors in a definite relation to each other. This clutch is particularly useful in connection with the conveyors operating in conjunction with a bread slicing machine and the conveyor of the bread wrapping machine. In this set-up it is essential that the conveyor delivering the bread from the slicing machine to the wrapping machine conveyor are synchronized for delivering the loaf at the proper time to be picked up by the conveyor of the bread wrapping machine.

The object of my invention is to provide a clutch having a single engaging tooth for timing the driven member with the driving member. A further object is to provide means for disengaging the clutch member and maintaining the clutch in disengaged relation to the driving member. A further object is to provide rotary means for engaging and disengaging the clutch. A further object is to provide a clutch which can be attached to the end of a driving member.

My invention will be further readily understood from the following description and claims, and from the drawing, in which latter:

Fig. 1 is an axial section of my improved clutch, taken on the line 1—1 of Fig. 2.

Fig. 2 is a plan view of the same.

Fig. 3 is a detail section, taken in the plane of the line 3—3 of Fig. 1; and,

Fig. 4 is a perspective view of the clutch housing.

I have shown my improved clutch mounted on a gear 11, which is suitably keyed and retained on a shaft 12 which may be part of the driving mechanism of a bread wrapping machine or its conveyor. A housing 13 is received over the hub of the gear 11 and suitably bolted thereto as by bolts 14. A clutch member 15 is secured to the housing as by screws 16 and is provided with a tapered projecting tooth 17 arranged to engage a tooth 18 extending from a suitable sprocket wheel 19. The sprocket wheel 19 is rotatably mounted on an extension 20 of the housing 13. A shifting plug 21 is received in the housing and has a pair of spring-pressed balls 22, which are received in grooves 23, in the extension 20, for maintaining the plug in the desired relation to the housing 13. One end of the plug is provided with extending lugs 24, arranged to ride on faces 25 in the housing, or when set at right angles to the position shown in Fig. 3, the lugs 24 will move inwardly and rest on the faces 26 of the housing. There are inclined faces 27 between the faces 25 and 26, to permit the lugs 24 to climb from the faces 26 to the faces 25. A spring 28 normally maintains the plug in a position whereby the lugs 24 will contact either the faces 25 or 26 secured to the upper end of the plug. I have shown a hand wheel 29 which acts as a retainer for the idling sprocket wheel 19 and also moves the lugs 24 to engage or disengage the clutch.

In the operation of my improved clutch, the parts are shown in engaged relation in the drawing. With the parts in such relation, the hand wheel 29 will rotate with the gear and sprocket wheel being held in rotating relation by means of the balls 22. When it is desired to break the driving connection, the hand wheel is gripped and held stationary until the lugs 24 align with the faces 26, whereupon the spring 28 will push the shifting plug 21 outwardly, causing the teeth 17 and 18 to ride out of engaging relation and permitting the sprocket wheel 19 to idle on its bearing 20. The hand wheel will continue to rotate with the gear 11 and the balls 22 will be received in grooves 30 for holding the hand wheel and plug in the released relation.

When it is desired to reengage the sprocket wheel with the driving member, the wheel is held stationary to permit the lugs 24 to ride up the tapered faces 27 for engagement of the lugs 24 with the faces 25. This relation will draw the hand wheel inwardly and also push the sprocket wheel 19 into a position for engagement of the tooth 18 with the tooth 17 of the housing. In using a single tooth the same clutching relation is maintained regardless of the position of the respective members upon throwing in the clutch.

Conveyors of the type wherein my invention is used, usually have carrier arms of brackets for engaging the loaves of bread and carrying them forward. Thus upon engagement of the clutch a synchronized arrangement between the conveyors is always maintained.

While I have shown one form of the invention, it is understood that various changes may be made within the scope of the appended claims.

Having thus fully described my invention, what I claim as new and desire to secure by Letters Patent, is:

1. In a clutch, a driving member, a housing secured to said driving member, a clutch tooth on said housing, a driven member idle on said housing being provided with a clutch tooth, an endwise movable member within said housing and means for engaging and disengaging said clutch teeth upon cessation of rotation of said movable member.

2. In a clutch, a driving member, a housing secured to said driving member, a clutch tooth on said housing, a driven member idle on said housing being provided with a clutch tooth, an endwise movable member within said housing and a hand wheel secured to said movable member for engaging and disengaging said clutch teeth.

3. In a clutch, a driving member, a housing secured to said driving member, a clutch tooth on said housing, a driven member idle on said housing being provided with a clutch tooth, means for shifting said driven member endwise comprising a movable member in said housing normally rotative with said housing and means for retarding the rotation of said movable member with respect to said housing for engaging or disengaging said clutch teeth.

4. In a clutch, a driving member, a housing secured to said driving member, a clutch tooth on said housing, a driven member idle on said housing being provided with a clutch tooth, means for shifting said driven member endwise comprising a movable member in said housing normally rotative with said housing and provided with extending lugs, a cooperating cam face on said housing whereby changing the rotative position of said movable member with respect to said housing will cause engagement or disengagement of said clutch teeth.

5. In a clutch, a driving member, a housing secured to said driving member, a clutch tooth on said housing, a driven member idle on said housing being provided with a clutch tooth, means for shifting said driven member endwise comprising a movable member in said housing normally rotative with said housing and provided with extending lugs, a cooperating cam face on said housing whereby changing the rotative position of said movable member with respect to said housing will cause engagement or disengagement of said clutch teeth and a spring for exerting an outward pressure on said movable member.

6. In a clutch, a driving member, a housing secured to said driving member, a clutch tooth on said housing, a driven member idle on said housing being provided with a clutch tooth, means for shifting said driven member endwise comprising a movable member in said housing normally rotative with said housing and provided with extending lugs, a cooperating cam face on said housing, whereby changing the rotative position of said movable member with respect to said housing will cause engagement or disengagement of said clutch teeth, a spring for exerting an outward pressure on said movable member and a handwheel fixed to said movable member for changing the relative rotative position of said movable member and housing.

WILLIAM L. SCHELLENBACH.